United States Patent
Prasky et al.

(10) Patent No.: US 9,128,852 B2
(45) Date of Patent: *Sep. 8, 2015

(54) PREFETCHING FOR A PARENT CORE IN A MULTI-CORE CHIP

(71) Applicant: International Business Machines Corporation, Armonk, NY (US)

(72) Inventors: Brian R. Prasky, Campbell Hall, NY (US); Fadi Y. Busaba, Poughkeepsie, NY (US); Steven R. Carlough, Wappingers Falls, NY (US); Christopher A. Krygowski, Lagrangeville, NY (US); Chung-lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,697

(22) Filed: Sep. 30, 2014

(65) Prior Publication Data

US 2015/0019820 A1    Jan. 15, 2015

Related U.S. Application Data

(63) Continuation of application No. 13/785,377, filed on Mar. 5, 2013.

(51) Int. Cl.
*G06F 12/08* (2006.01)

(52) U.S. Cl.
CPC .......... *G06F 12/0862* (2013.01); *G06F 12/084* (2013.01); *G06F 2212/6028* (2013.01); *G06F 2212/622* (2013.01)

(58) Field of Classification Search
CPC .................... G06F 12/0862; G06F 2212/6028; G06F 2212/6026; G06F 9/30047
USPC ........................................................ 711/137
See application file for complete search history.

(56) References Cited

U.S. PATENT DOCUMENTS 6,470,427 B1    10/2002 Arimilli et al.
7,509,481 B2    3/2009 Chaudhry et al.
(Continued)

FOREIGN PATENT DOCUMENTS

JP    2010217992 A    9/2010

OTHER PUBLICATIONS

Chaudhry et al., "High-Performance Throughput Computing," IEEE Computer Society, May-Jun. 2005, pp. 32-45.
(Continued)

*Primary Examiner* — Jasmine Song
(74) *Attorney, Agent, or Firm* — Cantor Colburn LLP; Margaret McNamara

(57) ABSTRACT

Embodiments of the invention relate to prefetching data on a chip having at least one scout core, at least one parent core, and a shared cache that is common between the at least one scout core and the at least one parent core. A prefetch code is executed by the scout core for monitoring the parent core. The prefetch code executes independently from the parent core. The scout core determines that at least one specified data pattern has occurred in the parent core based on monitoring the parent core. A prefetch request is sent from the scout core to the shared cache. The prefetch request is sent based on the at least one specified pattern being detected by the scout core. A data set indicated by the prefetch request is sent to the parent core by the shared cache.

11 Claims, 6 Drawing Sheets

(56) References Cited

U.S. PATENT DOCUMENTS

| | | | |
|---|---|---|---|
| 7,730,263 | B2 | 6/2010 | Burtscher et al. |
| 7,950,012 | B2 | 5/2011 | Tirumalai et al. |
| 7,962,314 | B2 | 6/2011 | Chernoff |
| 7,975,107 | B2 | 7/2011 | Beckmann et al. |
| 2004/0148491 | A1* | 7/2004 | Damron .......................... 712/34 |
| 2006/0155963 | A1 | 7/2006 | Bohrer et al. |
| 2007/0156971 | A1 | 7/2007 | Sistla et al. |
| 2008/0059715 | A1 | 3/2008 | Tomita et al. |
| 2008/0141268 | A1 | 6/2008 | Tirumalai et al. |
| 2009/0199181 | A1 | 8/2009 | Arimilli et al. |
| 2010/0241811 | A1 | 9/2010 | Solihin |
| 2010/0281282 | A1 | 11/2010 | Sawyers |
| 2010/0293312 | A1 | 11/2010 | Sonnier et al. |
| 2010/0299496 | A1 | 11/2010 | Arimilli et al. |
| 2011/0055805 | A1 | 3/2011 | Herdeg et al. |
| 2011/0113199 | A1 | 5/2011 | Tang et al. |
| 2011/0125971 | A1 | 5/2011 | Kruglick |
| 2011/0167416 | A1 | 7/2011 | Sager et al. |
| 2011/0231612 | A1 | 9/2011 | Karlsson et al. |
| 2011/0296431 | A1 | 12/2011 | Gschwind et al. |

OTHER PUBLICATIONS

Darouich et al., "Service de Configuration Predictif pour Plateforme Multicoeur Reconfigurable Heterogene," RenPar'18/SympA'2008/CFSE'6, version 1-4, Jan. 2008.

J. Lee, et al., "Prefetching with Helper Threads for Loosely Coupled Multiprocessor Systems." IEEE Transactions on Parallel and Distributed Systems: 2009, pp. 1-16; vol. 20.

UK Internation Search Report and Written Opinion for International Application No. PCT/IB2014/058939; International Filing Date: Feb. 2, 2014; Date of Mailing: May 13, 2014; 6 pages.

UK International Serach Report and Written Opinion for International Application No. PCT/IB2014/058955; International Filing Date: Feb. 13, 2014; Date of mailing: Jun. 16, 2014; 10 pages.

Ganusov et al. "Efficient Emulation of Hardward Prefetchers vis Event-Driven Helper Threading," Sep. 2006, pp. 144-153.

U.S. Appl. No. 13/785,369; Non-Final Office Action, Date Filed: Mar. 5, 2013, Date Mailed: Nov. 6, 2014; 22 pages.

U.S. Appl. No. 13/785,377; Non-Final Office Action; Date Filed: Mar. 5, 2013; Date Mailed: Oct. 23, 2014; 19 pages.

U.S. Appl. No. 13/785,389; Non-Final Office Action, Date Filed: Mar. 5, 2013; Date Mailed: Nov. 7, 2014; 21 pages.

U.S. Appl. No. 13/785,394; Non-Final Office Action; Date Filed: Mar. 5, 2013; Date Mailed: Jan. 14, 2015; 32 pages.

U.S. Appl. No. 14/501,661; Non-Final Office Action, Date Filed: Sep. 30, 2014; Date Mailed: Nov. 6, 2014; 19 pages.

U.S. Appl. No. 14/501,757; Non-Final Office Action; Date Filed: Sep. 30, 2014; Date Mailed: Nov. 6, 2014; 18 pages.

* cited by examiner

PREFETCHING FOR A PARENT CORE IN A MULTI-CORE CHIP

This application is a continuation of U.S. patent application Ser. No. 13/785,377, filed Mar. 5, 2013, the content of which is incorporated by reference herein in its entirety.

BACKGROUND

The present invention relates generally to multi-core chips having a parent core and a scout core, and more specifically, to prefetching for a parent core in a multi-core chip.

Single thread processor performance growth has been limited due to power requirements needed for single thread performance. Doubling the power requirements of a processor through increased frequency and/or functional features does not necessarily yield a performance gain greater than or equal to the increased power requirement. This is because the performance gain to power gain ratio is significantly skewed. To provide chip performance growth, significant portions of the power budget may be devoted to placing additional cores on a chip. While cache and memory sharing prevents the performance increase from being equal to the ratio increase in the number of cores, the performance gain for increasing a core count on the chip may yield a greater performance/watt gain than solely improving the performance of a single core processor.

In one approach to enhance single thread performance, a secondary core on the same chip as a primary or parent core may be leveraged as a scout core. Specifically, the scout core may be used to prefetch data from a shared cache into the parent core's private cache. This approach may be especially useful in the event the parent core encounters a cache miss. A cache miss occurs when a particular line of data causes a search of a directory of the parent core, and the requested line of cache is not present. One typical approach to obtain the missing cache line is to initiate a fetch operation to a higher level of cache. The scout core provides a mechanism that is used to prefetch data needed by the parent core.

It should be noted that various programs behave differently, and as a result one prefetching algorithm or approach may not always improve latency of accessing cache content. In approach to prefetch data to the parent core, a relatively small and simple algorithm which is a stride engine may be provided to speculatively prefetch data based on a stride observed between subsequent cache misses. To cover more complex patterns additional hardware is required which can be more complex and larger in physical size and power. However, per the chip trade-offs for throughput, latency, and wattage balancing, the amount of dedicated hardware that is available for prefetching may be core limited. Moreover, the amount of area and storage needed to monitor and detect cache misses may be too large to implement uniquely in hardware.

SUMMARY

Embodiments of the invention include a method and computer program product for prefetching data on a chip having at least one scout core, at least one parent core, and a shared cache that is common between the at least one scout core and the at least one parent core. A prefetch code is executed by the scout core for monitoring the parent core. The prefetch code executes independently from the parent core. The scout core determines that at least one specified data pattern has occurred in the parent core based on monitoring the parent core. A prefetch request is sent from the scout core to the shared cache. The prefetch request is sent based on the at least one specified pattern being detected by the scout core. A data set indicated by the prefetch request is sent to the parent core by the shared cache.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

An embodiment for prefetching data for a parent core by a scout core in a multi-core chip is disclosed. In one exemplary embodiment, the multi-core chip includes at least one parent core, at least one scout core, and a shared cache. The scout core monitors the activity of the parent core for at least one type of specified pattern created by the parent core, and determines if a prefetch request should be sent from the scout core to the shared cache. Upon receipt of the prefetch request from the scout core, the data requested by the prefetch is sent to the parent core. The data requested by the prefetch is only accepted by the parent core, and not the scout core. The scout core monitors the parent core for various types of specified data patterns occurring in the parent core. In contrast, some types of core dedicated hardware prefetchers that are currently available generally only have the capability to monitor the parent core for a specific subset of patterns. Also, the scout processor is capable of analyzing more data than a typical hardware prefetcher because of the amount of hardware that is reused by the scout core prefetcher.

Figure 1:
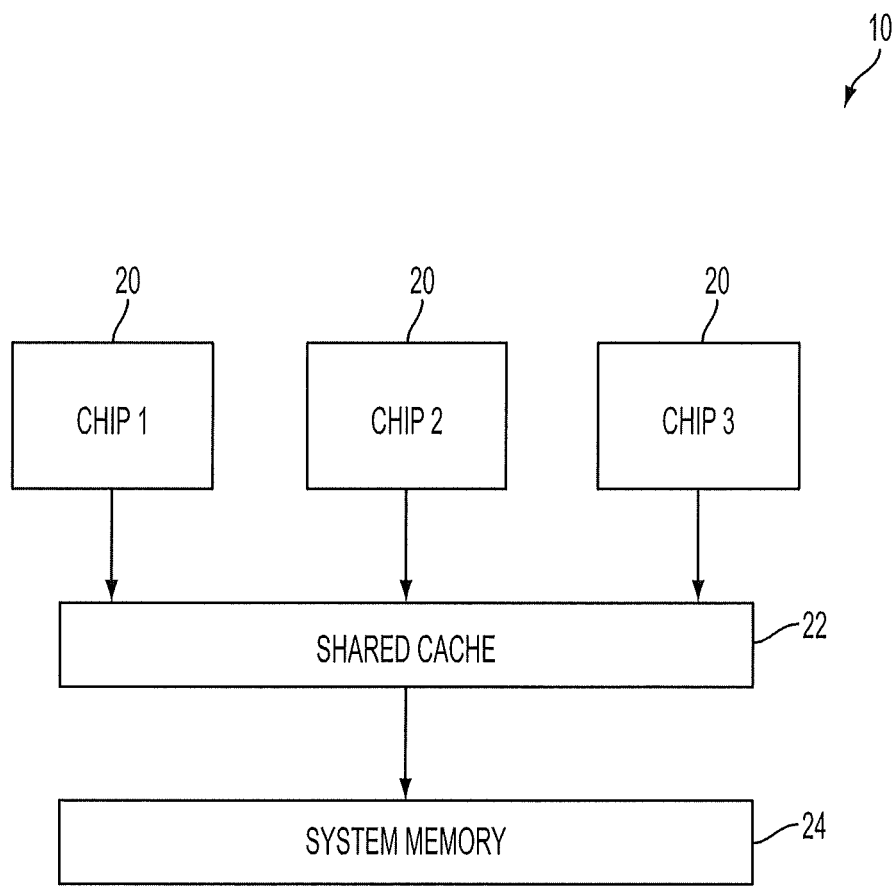
FIG. 1 depicts multi-core chips in accordance with an embodiment.

FIG. 1 illustrates an example of a computing system 10 in accordance with one embodiment. The computing system 10 includes at least one central processing (CP) chip 20. In the exemplary embodiment as shown in FIG. 1, three CP chips 20 are shown, however it is to be understood that any number of CP chips 20 may be used as well. Each CP chip 20 is in communication with a shared cache 22 and a system memory 24.

Figure 2:
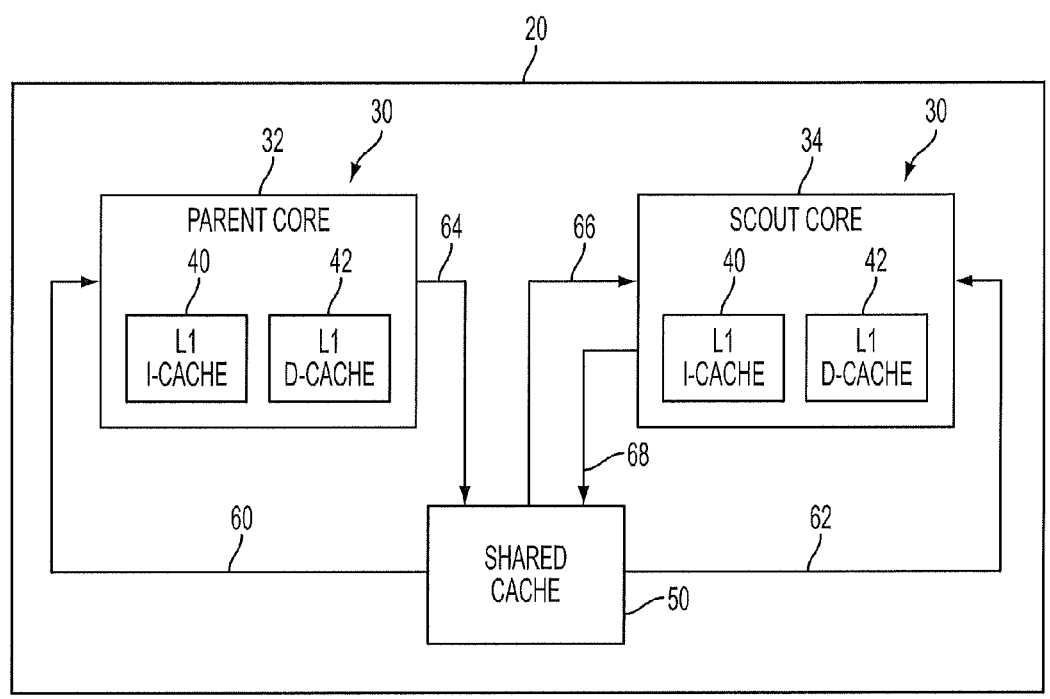
FIG. 2 depicts a central processing (CP) chip in accordance with an embodiment.
Figure 3:
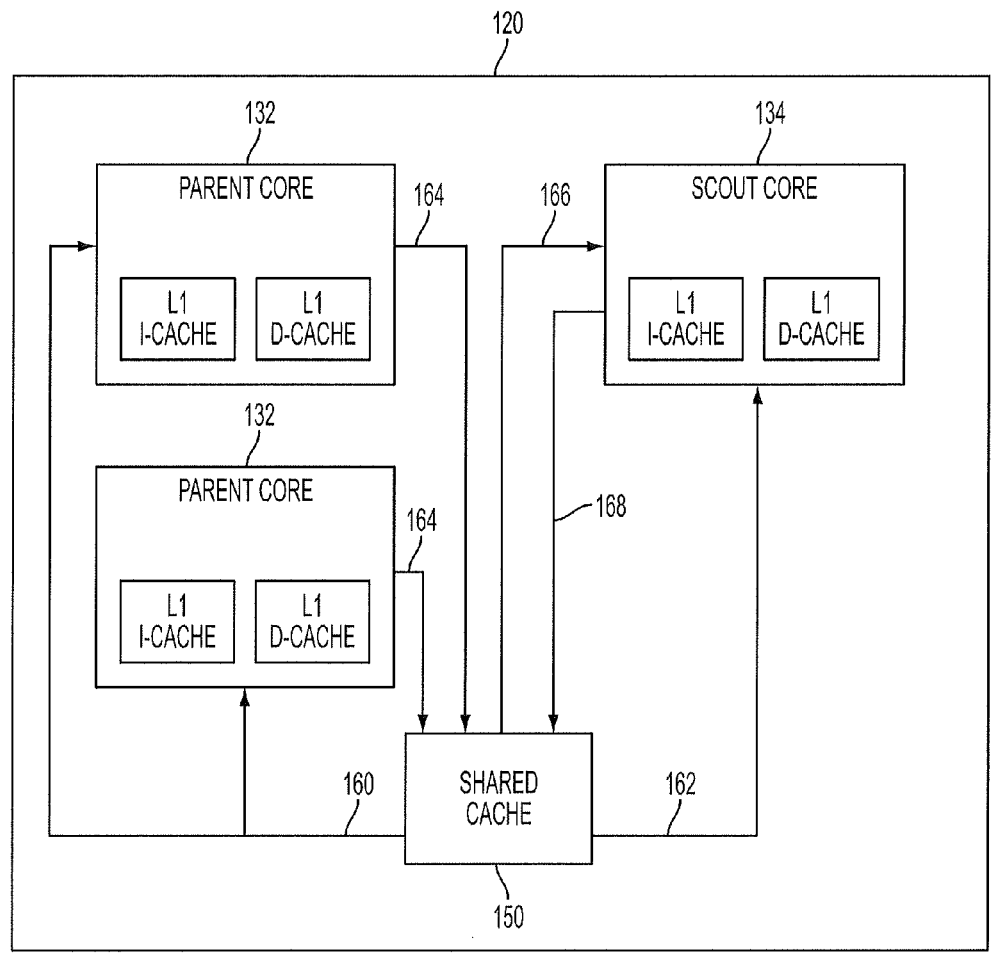
FIG. 3 depicts a CP chip in accordance with another embodiment.
Figure 4:
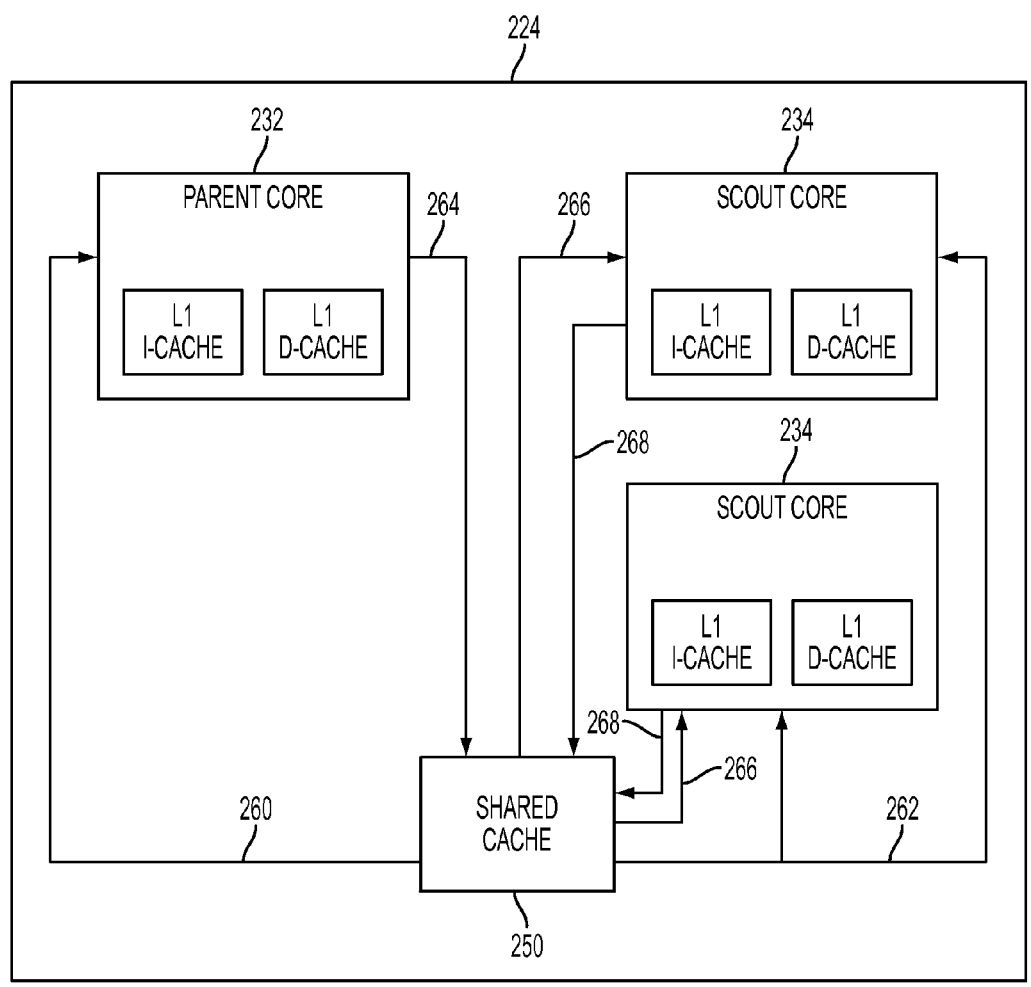
FIG. 4 depicts a CP chip in accordance with yet another embodiment.

Referring now to FIGS. 1-2, each CP chip 20 includes multiple cores 30 for the reading and executing of instructions. For example, in the exemplary embodiment as shown in FIG. 2, each CP chip 20 includes a parent core 32 and a scout core 34, however it is understood that any number of cores 30 may be used as well, and alternative embodiments of the CP chip are also illustrated in FIGS. 3-4. Referring to FIG. 2, each core 30 also includes a respective I-cache 40 and a D-cache 42. In the exemplary embodiment as shown in FIG. 2, the cores 30 each include only a level one (L1) cache, however it is to be understood that in various embodiments the cores 30 may also include a level two (L2) cache as well. Each core 30 is operatively coupled to a shared cache 50. In the embodiment as shown in FIG. 2, the shared cache 50 is an L2 cache, however it is to be understood that the shared cache 50 may also be a level three (L3) cache as well.

A data return bus 60 is provided between the parent core 32 and the shared cache 50, and a data return bus 62 is provided between the scout core 34 and the shared cache 50. A fetch request bus 64 connects the parent core 32 with the shared cache 50, where data is sent from the parent core 32 to the shared cache 50. A fetch monitoring bus 66 connects the scout core 34 with the shared cache 50, where the scout core 34 monitors the shared cache 50 through the fetch monitoring bus 66. A fetch request bus 68 is located between the scout core 34 and the shared cache 50 to send various prefetch requests from the scout core 34 to the shared cache 50. The fetch request bus 68 may also be used for typical fetching as that which is done by fetch request bus 64. Such fetching is needed for loading prefetch code into the scout core 34 along with potentially needing to load in further data for analysis should the data that is being analyzed does not fit entirely into the local data cache 42 and/or the prefetch code does not fit entirely into the local instruction cache 40.

In the embodiment as shown in FIG. 2, the shared cache 50 acts as a hub or a connection such that the scout core 34 may monitor the parent core 32. The scout core 34 monitors the parent core 32 for at least one specified data pattern occurring in the parent core 32. Specifically, the scout core 34 executes the prefetch code that is used to monitor the parent core 32. The prefetch code determines if one or more specified data patterns has occurred in the parent core 32, and sends a fetch request to the shared cache 50 based on the specified data pattern. Also, the prefetch code executes independently from any code that is executed by the parent core 32. The scout core 34 generally stores the prefetch code on the L1 I-cache 40 located in the scout core 34.

The specified data pattern may be a content request that leaves the parent core 32 (e.g., a request for a specific line of cache that is not present in the I-cache 40 and a D-cache 42 of the parent core 32), or alternatively, a checkpoint address of the parent core 32. For example, the parent core 32 may request a memory address from either the I-cache 40 or the D-cache 42. If the I-cache 40 or the D-cache 42 do not contain a specific line of cache requested from the parent core 32, then a cache miss has occurred. The scout core 34 detects the cache miss by monitoring the parent core 32 through the shared cache 50 by the fetch monitoring bus 66. In one embodiment, the scout core 34 determines if the cache miss has occurred in either the I-cache 40 or the D-cache 42 (or any other type of cache located in the parent core 32 that has encountered a cache miss). Upon detection of a cache miss, a prefetch for a projected future missing cache line may be sent to the shared cache 50 by the scout core 34 through the fetch request bus 68. In one approach, the scout core 34 may also check to determine if the specific line of cache is stored in the cache of the parent core 32 (e.g., the I-cache 40 and the D-cache 42). If the specific line of cache is in the parent core 32, then there is no need to prefetch the data which is already in the cache of the parent core 32.

In another approach, the checkpoint address of the parent core 32 may be passed between the parent core 32 and the scout core 34 through the shared cache 50. Specific checkpoint addresses may be representative of specific events. The specific event may be, for example, garbage collection or a context switch. In one exemplary embodiment, the checkpoint address may be associated with a specific line of cache in either the I-cache 40 or the D-cache 42 of the parent core 32, however it is to be understood that the checkpoint address may not necessarily be associated with a specific prefetch address. The scout core 34 monitors the parent core 32, and upon completion of the specified event, the scout core 34 sends a prefetch request to the shared cache 50 to acquire a cache line associated with the specified event.

Upon receipt of the prefetch request from the scout core 34, the shared cache 50 sends the data requested by the prefetch to the parent core 32 through the data return bus 60. The shared cache 50 sends the data requested by the prefetch to the parent core 32 as a function of the prefetch request. The data requested by the prefetch request is only accepted by the parent core 32, and not the scout core 34.

In one approach, the scout core 34 informs the parent core 32 that a prefetch was made on behalf of the parent core 32. Alternatively, in another approach, the shared cache 50 upon sending the data requested by the prefetch also informs the parent core 32 that a prefetch was made on the behalf of the parent core 32. Thus, the scout core 34 informs the shared cache 50 how to route and store the data on the parent core 32 requested by the prefetch as if the parent core 32 made the prefetch request (even though the scout core 34, and not the parent core 32, made the request). Thus, the data requested by the prefetch is stored in the I-cache 40 or the D-cache 42 of the parent core 32.

FIG. 3 is an alternative illustration of a CP chip 124 having a single scout core 134, but at least two parent cores 132. It should be noted that while FIG. 3 illustrates two parent cores 132, any number of multiple parent cores 132 may be used as well. In the embodiment as shown in FIG. 3, a data return bus 160 is provided between both of the parent cores 132 and the shared cache 150, and a data return bus 162 is provided between the scout core 134 and the shared cache 150. A fetch request bus 164 is provided for each of the parent cores 132, where the fetch request bus 164 connects the parent cores 132 with the shared cache 50. A fetch monitoring bus 166 connects the scout core 134 with the shared cache 150. A fetch request bus 168 is located between the scout core 134 and the shared cache 150 to send various prefetch requests from the scout core 134 to the shared cache 150.

FIG. 4 is an alternative illustration of a CP chip 224 having at least two scout cores 234, and one parent core 232. It should be noted that while FIG. 4 illustrates two scout cores 234, multiple scout cores 232 (e.g., more than two) may be used as well. In the embodiment as shown in FIG. 4, a data return bus 260 is provided between the parent core 232 and the shared cache 250. A data return bus 262 is provided for each of the scout cores 234, and is used to connect one of the scout cores 234 with the shared cache 250. A fetch request bus 264 connects the parent core 232 with the shared cache 250. A fetch monitoring bus 266 is provided for each of the scout cores 234, and is used to connect one of the scout cores 234 with the shared cache 250. A fetch request bus 268 is provided for each of the scout cores 234, and is used to connect one of the scout cores 234 with the shared cache 250.

In the embodiment as shown in FIG. 4, each of the scout cores 234 may be monitoring the parent core 232 for a different specified data pattern. For example, in one approach, one of the scout cores 234 may be monitoring and analyzing the behavior of an L1 I-cache 240 of the parent core 232, and the remaining scout core 234 may be monitoring and analyzing the behavior of an L1 D-cache 242 of the parent core 232. Thus, additional data may be monitored and analyzed within a given time period.

Figure 5:
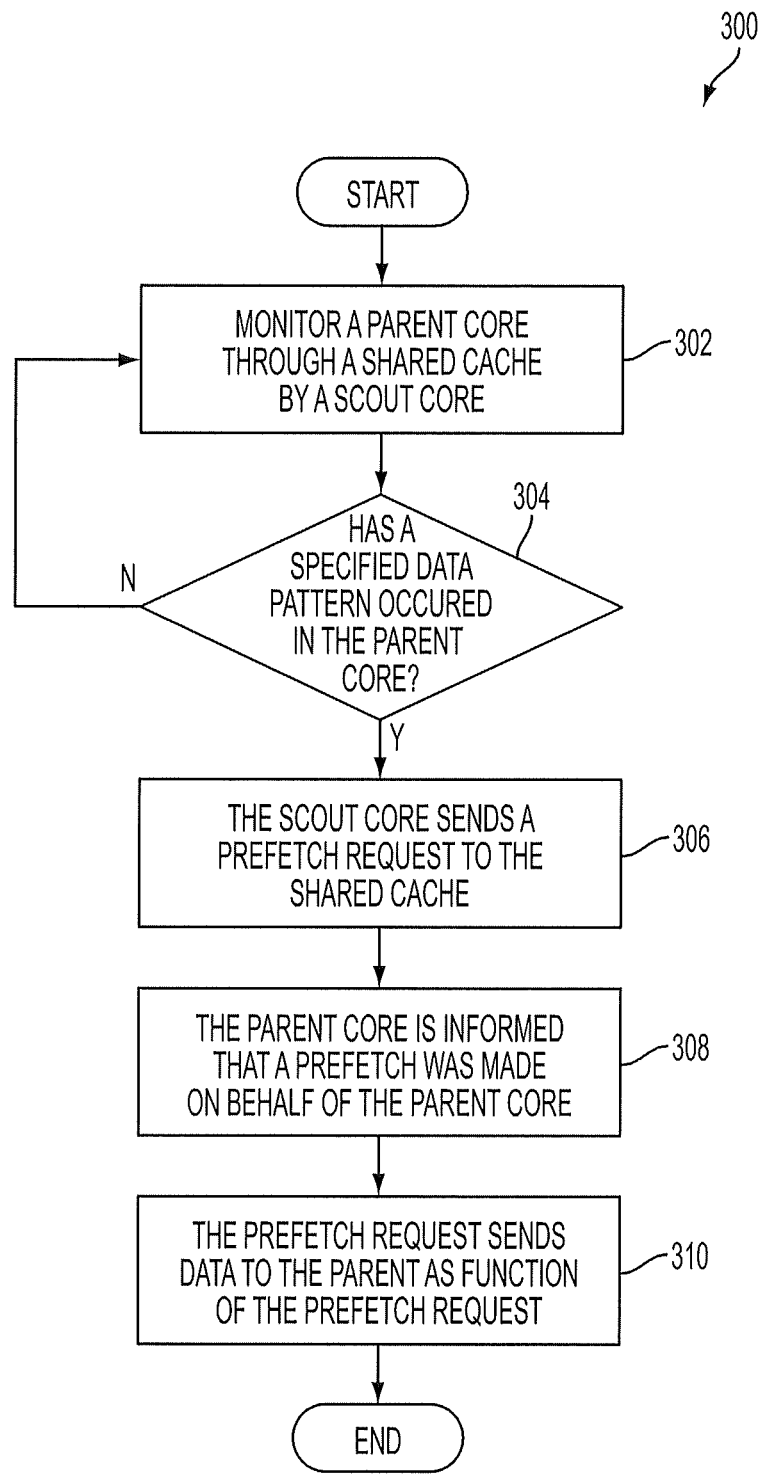
FIG. 5 depicts a process flow for illustrating a method of operation for prefetching data for a parent core by a scout core in accordance with an embodiment.

FIG. 5 is a process flow diagram illustrating a method 300 for prefetching data for the parent core 32 by the scout core 34 will now be discussed. Referring to FIGS. 1-5, method 300 begins at block 302, where the scout core 34 monitors the parent core 32 through the shared cache 50. Method 300 may then proceed to block 304.

In block 304, the scout core 34 monitors the parent core 32 for the specified data pattern occurring in the parent core 32. As discussed above, the specified data pattern may be either a content request that leaves the parent core 32 (e.g., a request for a specific line of cache that is not present in either the I-cache 40 and a D-cache 42 of the parent core 32), or alternatively, a checkpoint address. If the specified data pattern is not detected, method 300 may return to block 302. If the specified data pattern is detected, method 300 may proceed to block 306.

In block 306, the scout core 34 sends the prefetch request to the shared cache 50. As discussed above, the prefetch request may be, for example, a prefetch for the missing cache line sent to the shared cache 50 by the scout core 34. Method 300 may then proceed to block 308.

In block 308, the parent core 32 is informed that a prefetch was made on the behalf of the parent core 32. Method 300 may then proceed to block 310.

In block 310, the shared cache 50 sends the data requested by the prefetch to the parent core 32 through the data return bus 60. The shared cache 50 sends the data requested by the prefetch to the parent core 32 as a function of the prefetch request. In one embodiment, blocks 308 and 310 are performed at the same time. Method 300 may then terminate.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
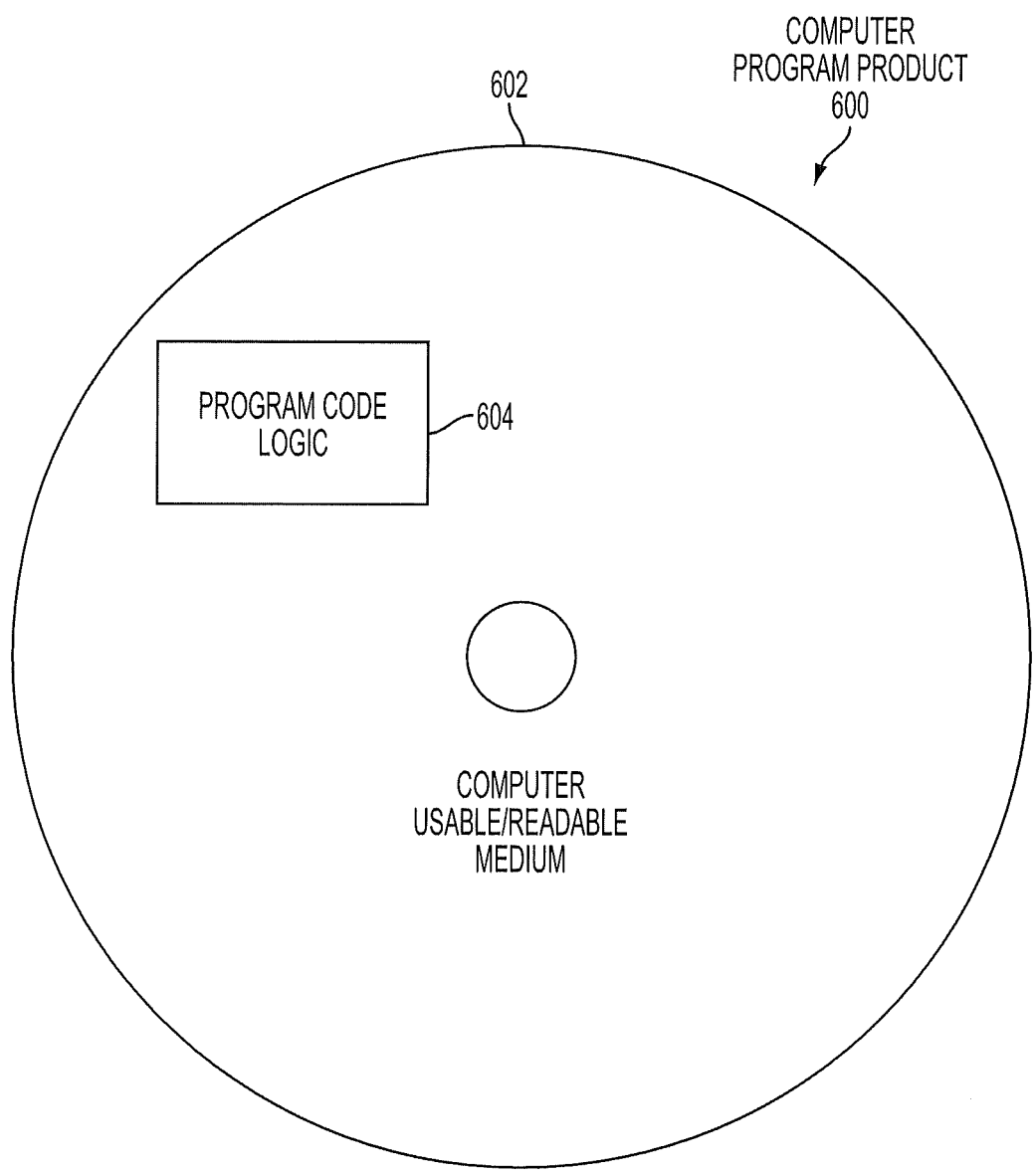
FIG. 6 illustrates a computer program product in accordance with an embodiment.

Referring now to FIG. 6, in one example, a computer program product 600 includes, for instance, one or more storage media 602, wherein the media may be tangible and/or non-transitory, to store computer readable program code means or logic 604 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Technical effects and benefits include of the computing system 10 as described above include creation of a program that may be executed by the L1 I-cache 40 of the scout core 34. The scout core 34 may monitor the parent core 32 for various types of specified data patterns occurring in the parent core 32. In contrast, some types of hardware prefetchers that are currently available may only monitor the parent core 32 for a specific pattern. Moreover, the amount of data patterns that may be monitored and analyzed by the scout processor 34 may be relatively larger than a hardware prefetcher that is currently available, as the entire L1 D-cache 42 of the scout processor 34 may be used for storing data that may be analyzed.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for prefetching data on a chip having at least one scout core, at least one parent core, and a shared cache that is common between the at least one scout core and the at least one parent core, the computer program product comprising:
   a non-transitory tangible storage medium readable by a processing circuit and storing instructions for execution by the processing circuit for performing a method comprising:
      executing a prefetch code by the at least one scout core, the prefetch code executing independently from the at least one parent core, the prefetch code including:
         monitoring for specified data patterns in the at least one parent core, the specified data patterns including at least one of a cache miss occurring in a cache located in the at least one parent core and a checkpoint address of the at least one parent core;
      determining by the at least one scout core that at least one of the specified data patterns has occurred in the at least one parent core, the determining based on the monitoring;
      sending a prefetch request from the at least one scout core to the shared cache, the sending based on the determining; and
      sending, by the shared cache, a data set indicated by the prefetch request to the at least one parent core.

2. The computer program product as claimed in claim 1 further comprising informing the at least one parent core that the prefetch request was made on behalf of the at least one parent core.

3. The computer program product as claimed in claim 1 wherein at least one scout core informs the shared cache how to route and store the data requested by the prefetch request in a cache located in the at least one parent core.

4. The computer program product as claimed in claim 1 wherein the chip includes at least two parent cores that are each in communication with the shared cache.

5. The computer program product as claimed in claim 1 wherein the chip includes at least two scout cores that are in communication with the shared cache, and wherein the scout cores monitor the at least one parent core for a different specified data pattern.

6. The computer program product as claimed in claim 1 wherein the at least one scout core monitors the at least one parent core through a fetch monitor bus, wherein the fetch monitor bus connects the at least one scout core with the shared cache.

7. A computer implemented method for prefetching data on a chip having at least one scout core, at least one parent core, and a shared cache that is common between the at least one scout core and the at least one parent core, the method comprising:
   executing a prefetch code by the at least one scout core, the prefetch code executing independently from the at least one parent core, the prefetch code including:
      monitoring for specified data patterns in the at least one parent core, the specified data patterns including at least one of a cache miss occurring in a cache located in the at least one parent core and a checkpoint address of the at least one parent core;
   determining by the at least one scout core that at least one of the specified data patterns has occurred in the at least one parent core, the determining based on the monitoring the at least one parent core;
   sending a prefetch request from the at least one scout core to the shared cache, the sending based on the determining; and
   sending, by the shared cache, a data set indicated by the prefetch request to the at least one parent core.

8. The method as claimed in claim 7 further comprising informing the at least one parent core that the prefetch request was made on behalf of the at least one parent core.

9. The method as claimed in claim 7 wherein the at least one scout core informs the shared cache how to route and store the data requested by the prefetch request in a cache located in the at least one parent core.

10. The method as claimed in claim 7 wherein the chip includes at least two parent cores that are each in communication with the shared cache.

11. The method as claimed in claim 7 wherein the chip includes at least two scout core that are in communication with the shared cache, and wherein the scout cores monitor the at least one parent core for a different specified data pattern.

* * * * *